J. A. ROBERTSON.
PHOTOGRAPHIC PLATE HOLDER.
APPLICATION FILED MAY 16, 1914.
1,190,954.
Patented July 11, 1916.
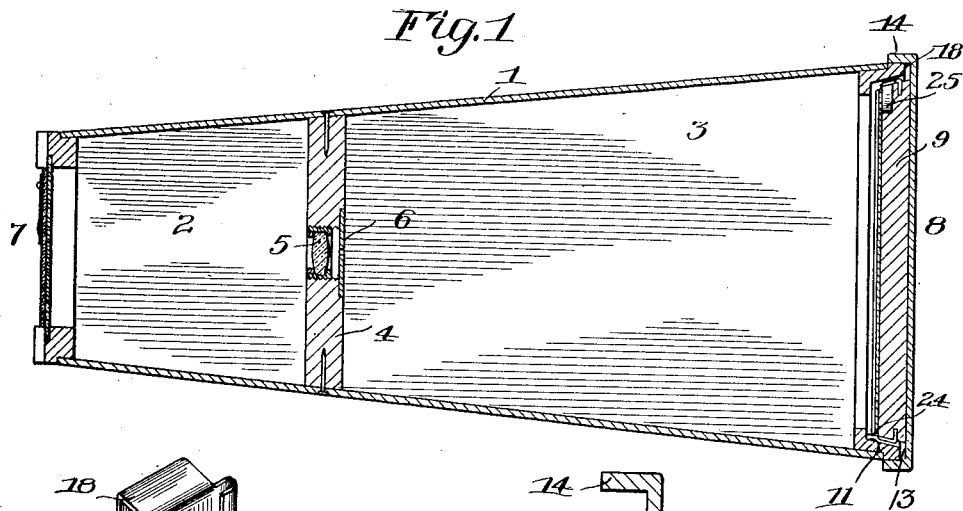
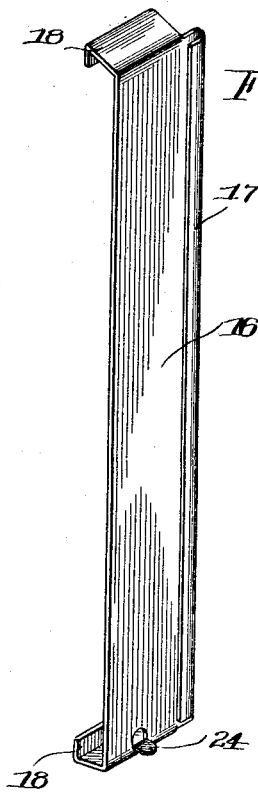
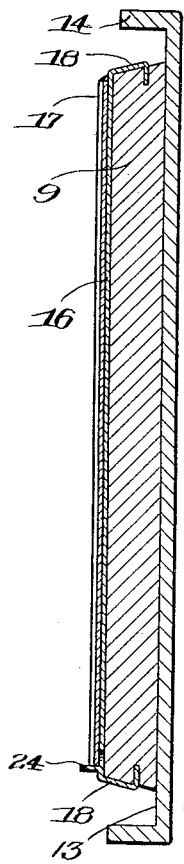
Witnesses
Nelson H. Copp
Inventor
John A. Robertson
By Church & Rich
his Attorneys J. A. ROBERTSON.
PHOTOGRAPHIC PLATE HOLDER.
APPLICATION FILED MAY 16, 1914.
1,190,954.
Patented July 11, 1916.
2 SHEETS—SHEET 2.
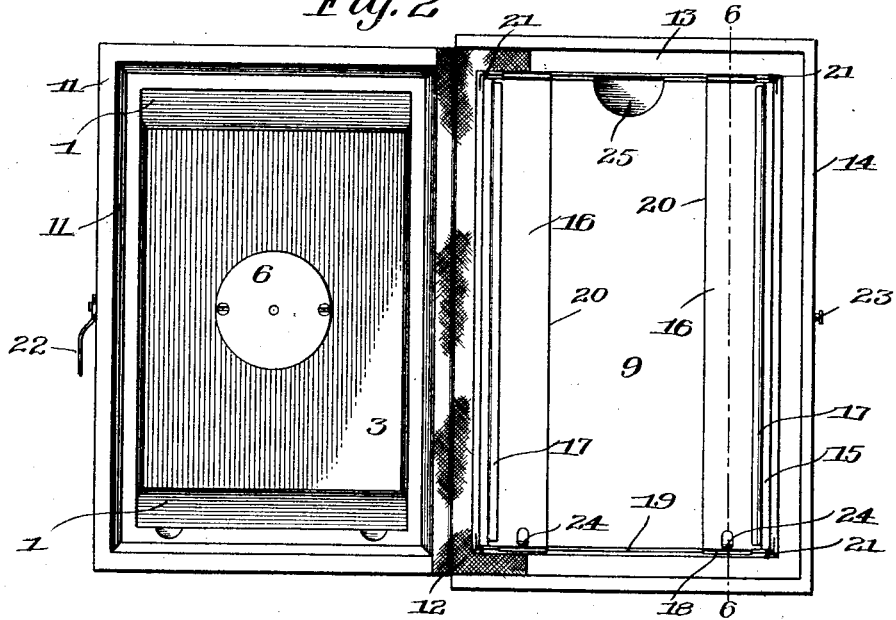
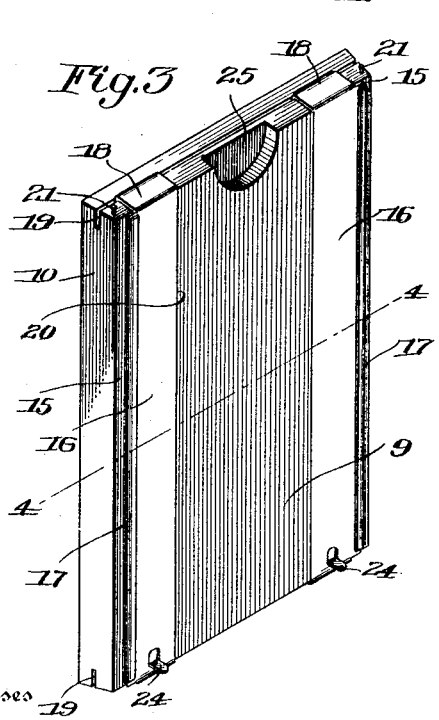
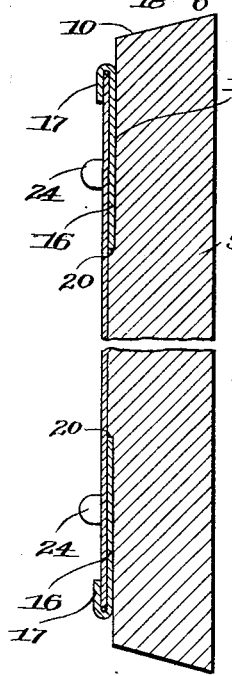
Witnesses
Nelson H. Copp
Inventor
John A. Robertson
By
his Attorneys

UNITED STATES PATENT OFFICE.

JOHN A. ROBERTSON, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-PLATE HOLDER.

1,190,954. Specification of Letters Patent. Patented July 11, 1916.

Application filed May 16, 1914. Serial No. 838,920.

*To all whom it may concern:*

Be it known that I, JOHN A. ROBERTSON, of Rochester, in the county of Monroe and State of New York, have invented certain new and useful Improvements in Photographic-Plate Holders; and I do hereby declare the following to be a full, clear, and exact description of the same, reference being had to the accompanying drawings, forming a part of this specification, and to the reference-numerals marked thereon.

My present invention relates to photography and optics and more particularly to lens cameras and it has for its object to provide a simple and efficient form of holder for suitably maintaining plates or cards in the focal plane of a lens, which holder may be conveniently manufactured in quantities and produced at a relatively low cost.

To these and other ends the invention consists in certain improvements and combinations of parts all as will be hereinafter more fully described, the novel features being pointed out in the claims at the end of the specification.

In the drawings: Figure 1 is a central longitudinal section through a photographic enlarging camera provided with a plate holding back constructed in accordance with and illustrating one embodiment of my invention; Fig. 2 is a rear elevation of the camera, with the back or plate holder swung to open position where it appears in front elevation; Fig. 3 is a perspective view of the back or plate holder removed; Fig. 4 is a transverse or horizontal section through the holder taken substantially on the line 4—4 of Fig. 3; Fig. 5 is a detail perspective view of one of the retaining plates, and Fig. 6 is a vertical section taken substantially on the line 6—6 of Fig. 2.

Similar reference numerals throughout the several figures indicate the same parts.

I have illustrated my invention in the present instance as applied to a photographic enlarging camera of a simple type embodying (Fig. 1) a case or dark box 1 divided into a light chamber 2 at the front and a dark chamber 3 at the rear by a partition 4 carrying a lens 5 and diaphragm 6. At the front of the light chamber is the negative holder indicated generally at 7, while at the rear of the dark chamber is the holder for the sensitized material indicated generally at 8. It is this last mentioned holder that the present improvements are directed toward. The said holder comprises, in the present instance, a backboard or support 9 that may consist of a wooden block tapered toward the front as indicated at 10 in Figs. 3 and 4 to occupy a similarly formed seat 11 at the rear of the dark box. It swings into and out of engagement with the seat on a cloth or other hinged connection 12 (Fig. 2) connected to a cover plate 13 on the rear face of the backboard and flanged at 14 to overlap the edges of the dark box in a light tight manner.

The block or board 9 is provided with shallow, flat recesses 15 at each side of its front face in which are disposed retaining plates 16 of flat sheet metal, the lateral edges of each of which are turned forwardly and thence inwardly to form continuous holding flanges 17 for engaging the edges of photographically sensitive sheets such as films, plates, cards or other plate-like forms hereinafter referred to as the "object." The plates are of such relative proportion to and lie within the depressions 15 in such manner as to be shiftable laterally therein while maintained with their outer or forward surfaces flush with the face of the block 9 and to these ends, their ends, beyond the object holding flanges 15 are flanged rearwardly and thence inwardly as at 18 to coöperate in an interlocking manner with guiding grooves 19 cut in the end faces of the block 9. The shifting movements of the plates while so mounted are limited in an inward direction by the inner walls 20 of the depressions and in an outward direction by suitable stops such as pins 21 that may be driven into the block 9 after the plates have been mounted or assembled from a lateral edge of the latter by thrusting the guiding flanges 18 into the slots 19 edgewise from the side.

The back or holder may be loaded while in the outwardly swung position of Fig. 2 and then closed into coöperation with the camera box or dark chamber as shown in Fig. 1 and secured by a hook and pin 22 and 23 (Fig. 2) or other suitable fastening devices.

The present holder is designed more particularly for enlarging negative prints upon sensitive paper of postcard size and as these often vary slightly in width, the adjustable feature of the holding flanges 17 is utilized to accommodate them, the plates being drawn together or separated in a transverse direction as required within the limits of the pins 21 on one side and the walls 20 of the depressions 15 on the other. The cards are inserted within the flanges 17 from the upper ends thereof which are open, as clearly shown in Fig. 3 and ultimately rest upon stops 24 at the lower ends that, in the present instance, are struck up from the material of the plates 16 into the plane of the flanges 17. A recess 25 in the backboard 9 accommodates the fingers of the operator while inserting or removing the cards.

It will be observed that the cards are effectually supported against a flat and continuous, rigid backing surface in the exact focal plane of the lens by reason of the plates 16 being flush with the face of the backboard 9.

A holder constructed in accordance with my invention is not necessarily limited to use in connection with a photographic enlarging camera as shown herein, its primary function being to support a plate or card in the focal plane of the lens of a dark box or camera of any kind.

I claim as my invention:

1. In a plate holding back for dark boxes, the combination with a back board or support, of a pair of retaining plates mounted on the face thereof and each provided at its outer edge with a continuous inturned object engaging flange, one of said plates being adjustably movable toward and from the other in a direction transversely of the flanges, and a stop at one end of one of the plates projecting into the plane of the flanges, the opposite ends of the latter being adapted for the sliding insertion of a plate between them.

2. In a plate holding back for dark boxes, the combination with a back board or support having flat depressions in the face thereof at opposite sides, of a pair of retaining plates mounted in the depressions to lie with their upper surfaces flush with the face of the back and each provided at its outer edge with an inturned object engaging flange, and guides on the back board in which the retaining plates are movable toward and from each other in a direction transversely of the flanges.

3. In a plate holding back for dark boxes, the combination with a back board or support having grooves in two of its opposite end faces, of a pair of sheet metal retaining plates mounted to lie against the face of the back board and having rearwardly and thence inwardly turned guiding flanges coöperating with the grooves in the back board, the outer side edges of the plates being provided with object holding means and the said plates being adjustably movable transversely in the grooves to carry the holding means toward and from each other.

JOHN A. ROBERTSON.

Witnesses:
HENRY L. THAYER,
A. W. COLLINS.

Copies of this patent may be obtained for five cents each, by addressing the "Commissioner of Patents, Washington, D. C."